(12) United States Patent
Ni et al.

(10) Patent No.: US 9,660,693 B1
(45) Date of Patent: May 23, 2017

(54) SPATIO-TEMPORAL SIGNAL MONITORING

(71) Applicant: HRL LABORATORIES LLC, Malibu, CA (US)

(72) Inventors: Kang-Yu Ni, Calabasas, CA (US); Shankar R. Rao, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 4 days.

(21) Appl. No.: 14/328,346

(22) Filed: Jul. 10, 2014

(51) Int. Cl.
*H04B 1/00* (2006.01)
*H04B 1/715* (2011.01)

(52) U.S. Cl.
CPC ..... *H04B 1/715* (2013.01); *H04B 2001/7152* (2013.01)

(58) Field of Classification Search
None
See application file for complete search history.

(56) References Cited

U.S. PATENT DOCUMENTS

| | | | | | |
|---|---|---|---|---|---|
| 8,032,085 | B2* | 10/2011 | Mishali | .................. | H04B 1/667 370/203 |
| 8,457,579 | B2* | 6/2013 | Mishali | ................. | H04B 1/0092 455/130 |
| 2010/0246920 | A1* | 9/2010 | Vaswani | ............ | G06K 9/00523 382/131 |
| 2013/0128932 | A1* | 5/2013 | Huang et al. | ................. | 375/219 |
| 2014/0140375 | A1* | 5/2014 | Muqaibel | ........... | H04B 1/71637 375/146 |

OTHER PUBLICATIONS

U.S. Appl. No. 14/204,028, filed Mar. 11, 2014, Owechko et al.
E. Candes and T. Tao, "Near Optimal Signal Recovery From Random Projection: Universal Encoding Strategies?", IEEE Trans. on Information Theory, vol. 52, No. 12, pp. 5406-5425, Dec. 2006.
D.L. Donoho, "Compressed Sensing", IEEE Trans on Information Theory, vol. 52, No. 4, pp. 1289-1306, Apr. 2006.

(Continued)

*Primary Examiner* — Wednel Cadeau
(74) *Attorney, Agent, or Firm* — Ladas & Parry

(57) ABSTRACT

A spatio-temporal signal monitoring system includes a sampler configured to receive a radio frequency signal and obtain first compressive sensing measurements of said received signal at a first resolution level, and a signal detector configured to identify at least one signal of interest based on said first compressive sensing measurements and perform second compressive sensing measurements on said at least one signal of interest at a second resolution level, said second resolution level being higher than said first resolution level. The received signal may be analyzed as an array or image having two or more dimensions, based on frequency and on at least one other parameter, such as angle-of arrival, and may be analyzed at a higher level of resolution at the frequencies and angles corresponding to a signal of interest (SOI). Estimates of the frequency and/or the at least one other parameter may be generated by the system. The system may be used to monitor a wideband RF spectrum and/or track signals, such as frequency-hopping signals.

14 Claims, 8 Drawing Sheets

(56) References Cited

OTHER PUBLICATIONS

X. Kong and M. Ahmed, "Quick Signal Detection and Dynamic Resource Allocation Scheme for Ultra-Wideband Radar", Proc. of SPIE vol. 8021, pp. 80211-802111-12, (2010); DOI 10.1117/12.883228.

K.-Y. Ni, X. Kong, R.M. Matic and M. Ahmed, "Accurate Reconstruction of Frequency-Sparse Signals From Non-Uniform Samples", Proc. of SPIE vol. 8361, pp. 836109-1-836109-6, (2012); DOI 10.1117/12.920289.

Owechko, K.-Y. Ni, and S.R. Rao, Foveated Compressive Sensing System, 2011. U.S. Appl. No. 14/204,028, filed Mar. 11, 2014.

\* cited by examiner

SPATIO-TEMPORAL SIGNAL MONITORING

TECHNICAL FIELD

This disclosure relates to systems and methods for spatio-temporal signal monitoring and, optionally, parameter estimation.

BACKGROUND

Spectrum sweeping devices are used to detect signals transmitted within a frequency band. Some spectrum sweeping applications require a search for signals over a wide bandwidth, in which case the time required for a sweep of the frequency band might be considerable. This can be problematical when fast detection of signals is needed, so that a response can be provided quickly with real-time signal processing. One way to reduce the required time is to utilize multiple receivers or channelizers to allow portions of the frequency band to be swept in parallel, but such systems may be expensive to set up and require substantial computing resources.

Compressed sensing schemes can be used to reconstruct a detected signal using a reduced number of samples, under an assumption that the signal is sparse. The sampling rate required by such schemes may be less than the rate predicted by the Nyquist sampling theorem. However, compressed sensing schemes may have high computational complexity, making them less useful for applications requiring real-time signal processing. Such compressed sensing schemes are also limited to specific classes of signals, since they assume a specific sparsifying transfer domain, and do not allow for simultaneous reconstruction of multiple unknown parameters.

Also, parameter estimation algorithms used to determine characteristics of detected signals may be subject to other limitations. For example, the Multiple Signal Classifier (MUSIC) algorithm can be used to determine the angle-of-arrival of uncorrelated signals, but does not handle multipath signals effectively.

SUMMARY

The present disclosure relates to a spatio-temporal radio frequency signal detection system, a spatio-temporal radio frequency signal monitoring system and a related method. In such systems and such a method, a foveated compressive sensing (FCS) technique may be used, in which samples are taken at more than one resolution and at more than one level in a hierarchically structured scheme. Such systems and such a method may be used to detect and track frequency hopping signals.

The present disclosure also provides a system and method for angle-of arrival estimation and/or detection.

According to one embodiment, a spatio-temporal signal monitoring system includes a sampler configured to receive a radio frequency signal in a first frequency band, said radio frequency signal covering a first range of at least one other parameter of the radio frequency signal, and obtain first compressive sensing measurements of said received signal at a first resolution level, and a signal detector configured to identify a first signal of interest based on said first compressive sensing measurements, determine a second frequency band corresponding to a signal of interest within the received radio signal, the second frequency band being narrower than the first frequency band, and a second range of the at least one other parameter corresponding to the signal of interest, said second range being narrower than said first range, the sampler being further configured to obtain second compressive sensing measurements of said received signal at a second resolution level, said second compressive sensing measurements corresponding to said second frequency band and said second range of said at least one other parameter, and said second resolution level being higher than said first resolution level.

Optionally, the signal detector may be further configured to identify a second signal of interest based on said second compressive sensing measurements, determine a third frequency band corresponding to the second signal of interest and a third range of said at least one other parameter corresponding to said second signal of interest, said third frequency band being narrower than said second frequency band and said third range being narrower than said second range, and obtain third compressive sensing measurements of said received signal at a third resolution level, said third compressive sensing measurements corresponding to said third frequency range and said third range, and said third level of resolution being higher than said second level of resolution.

Alternatively, or additionally, the signal detector may configured to output an estimate of said at least one parameter of the second signal of interest, based on said second range, and/or output an estimate of said at least one parameter of a subsequently identified signal of interest within said second signal of interest, based on a subsequently determined range of said at least one parameter, said subsequently determined range being narrower than said second range. Such a parameter may be, or may include information regarding, an angle-of-arrival of the second signal of interest.

The signal detector may optionally be configured to output an estimate of the at least one other parameter of the first signal of interest, such as angle-of-arrival.

The system may be configured to continue obtaining first compressive sensing measurements of the radio frequency signal in the first frequency band to track the signal of interest, where said signal of interest is a frequency-hopping signal.

According to another embodiment, a signal detection system includes a sampler configured to receive a radio frequency signal and obtain first compressive sensing measurements of said received signal at a first resolution level, and a signal detector configured to identify at least one signal of interest based on said first compressive sensing measurements, the sampler being further configured to perform second compressive sensing measurements on said at least one signal of interest at a second resolution level, said second resolution level being higher than said first resolution level.

The signal detector may be configured to generate an estimate of at least one parameter of said at least one signal of interest based on said second compressive sensing measurements. The at least one other parameter may be, or may include information regarding, an angle-of-arrival.

According to yet another embodiment, a spatio-temporal signal monitoring method includes receiving a radio frequency signal, obtaining first compressive sensing measurements of said received signal at a first resolution level, identifying at least one signal of interest based on said first compressive sensing measurements, and performing second compressive sensing measurements on said at least one signal of interest at a second resolution level, said second resolution level being higher than said first resolution level.

Optionally, such a method may be implemented so that said received radio frequency signal covers a first frequency band and a first range of at least one other parameter of the radio frequency signal, said identifying at least one signal of interest includes determining a second frequency band corresponding to the at least one signal of interest, the second frequency band being narrower than the first frequency band, and a second range of the at least one other parameter corresponding to the at least one signal of interest, said second range being narrower than said first range, and said second compressive sensing measurements correspond to said second frequency band and within said second range.

The signal detector may be configured to output an estimate of said at least one parameter of the second signal of interest, based on said second range.

The at least one parameter may be, or may include, angle-of-arrival information.

Optionally, an estimate of said at least one parameter of a subsequently identified signal of interest within said second signal of interest, based on a subsequently determined range of said at least one parameter, may be output, said subsequently determined range being narrower than said second range.

In some examples, the method may additionally, or alternatively, include identifying a second signal of interest based on said second compressive sensing measurements, determining a third frequency band corresponding to the second signal of interest and a third range of said at least one other parameter corresponding to said second signal of interest, said third frequency band being narrower than said second frequency band and said third range being narrower than said second range, and obtaining third compressive sensing measurements of said received signal at a third resolution level, said third compressive sensing measurements corresponding to said third frequency range and said third range, and said third level of resolution being higher than said second level of resolution.

The method may further include continuing to obtain first compressive sensing measurements of the radio frequency signal in the first frequency band to track the signal of interest, for example, where said signal of interest is a frequency-hopping signal.

BRIEF DESCRIPTION OF THE DRAWINGS

Example embodiments will now be described with reference to the following drawings, of which.

DETAILED DESCRIPTION

Figure 1:
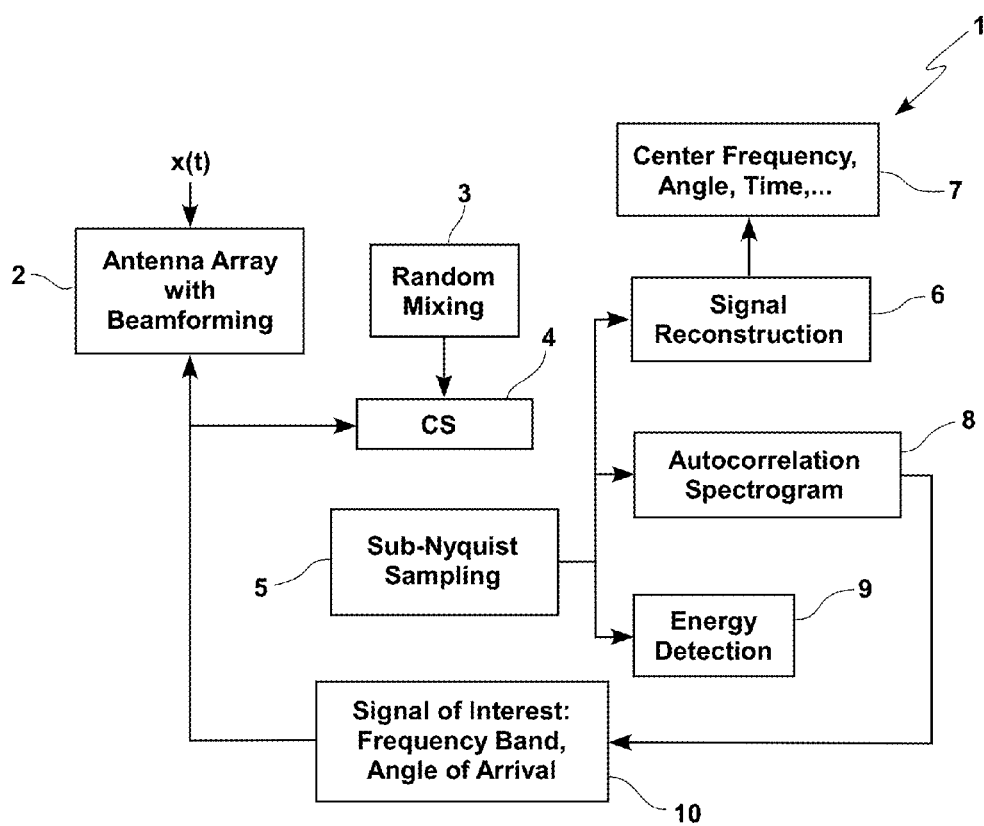
FIG. 1 is an overview of a signal detection system according to an example embodiment.

FIG. 1 depicts the architecture of a signal monitoring system 1 according to an embodiment. A sensor, such as an antenna array 2, is arranged to detect radio frequency signals x(t) within a frequency band W.

A RF signal x(t) is received by an antenna array 2. The received signal x(t) is then processed, the processing including random mixing 3, compressive sensing filtering 4 and Sub-Nyquist sampling 5 as shown in FIG. 1. A reconstruction 6 of the received signal, based on the samples, is then made, from which a determination 7 of parameters such as center frequency of the signal, angle-of-arrival and time-of-arrival can be made. Analysis of the samples can also be used to identify a "signal of interest" SOI within the received signal x(t), for example by utilizing an autocorrelation spectrogram 8 and/or energy detection 9 on the sub-Nyquist samples. Frequency information and/or angle-of-arrival information for the SOI can be provided to the antenna array so that the SOI can be tracked, shown at 10 in FIG. 1.

Figure 2:
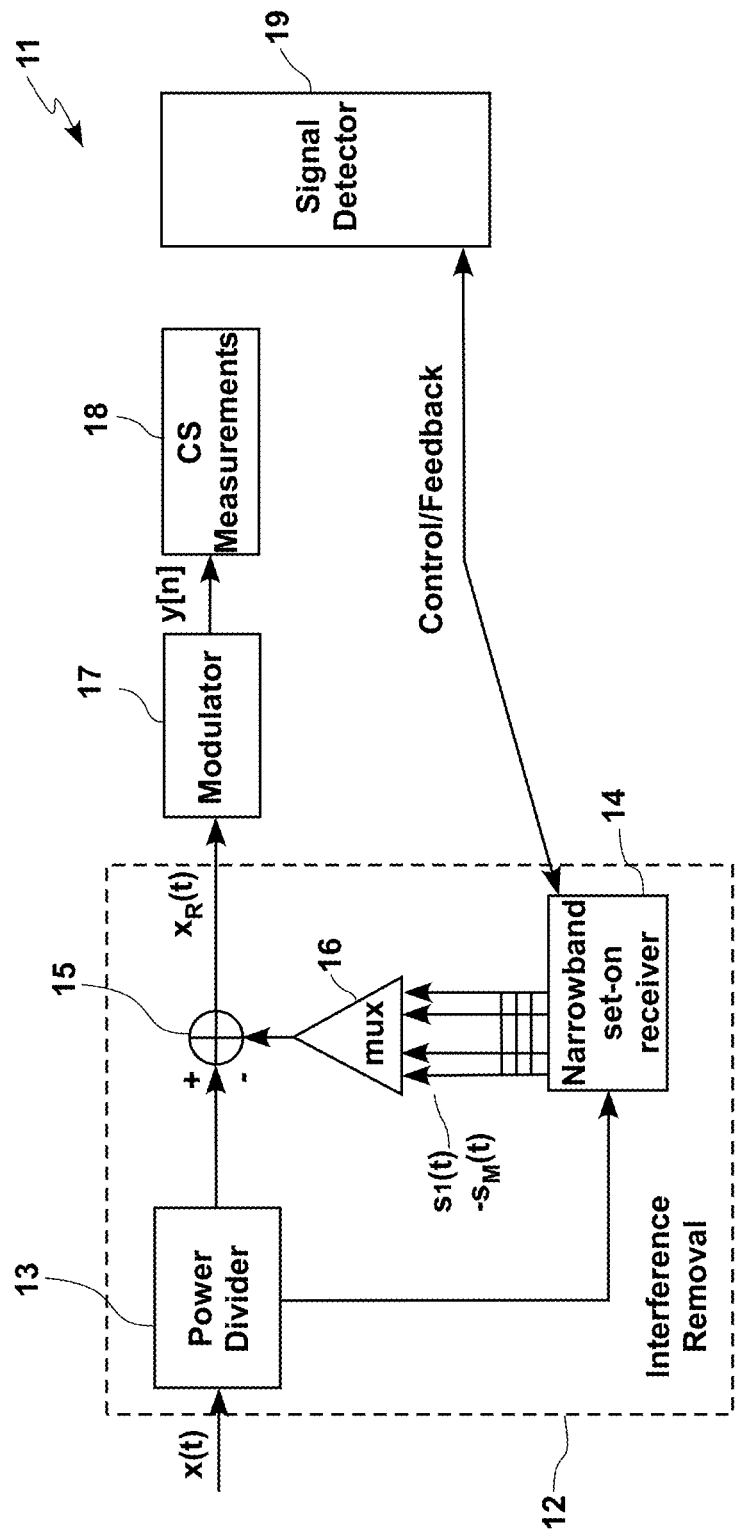
FIG. 2 is a block diagram of signal detection apparatus in the system of FIG. 1.

FIG. 2 depicts a signal detection apparatus 11 in the system of FIG. 1. The apparatus 11 has an interference removal stage 12, which includes a power divider 13, a narrowband receiver 14, a mixer 15, and a multiplexer 16. The apparatus 11 also includes a modulator 17, a sampler 18, configured to perform compressive sensing measurements, and a signal detector 19, configured to perform signal analysis and provide control signals and feedback to the interference removal stage 12. The sampler 18 and/or the signal detector 19 be provided in the form of a computer processor or microprocessor or using hardware.

Figure 3:
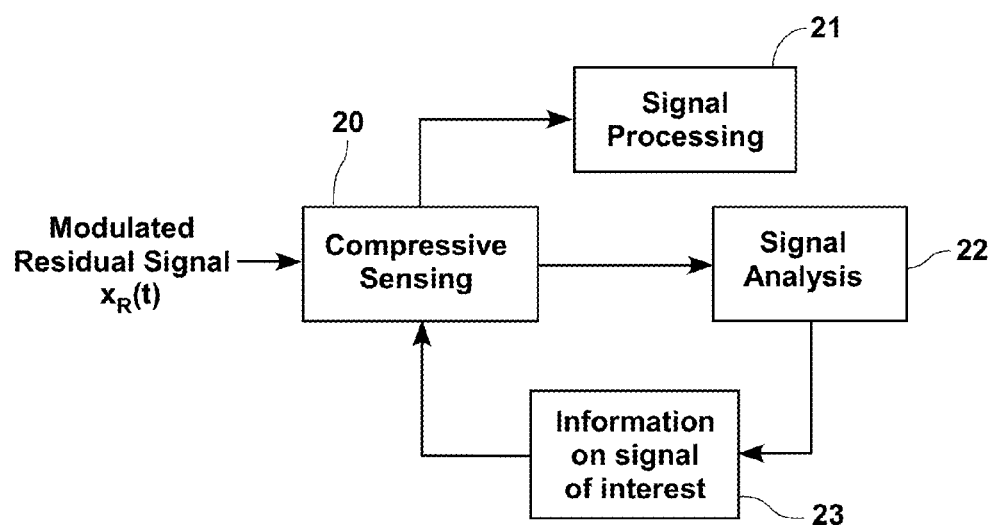
FIG. 3 is an overview of signal processing and analysis performed by the apparatus of FIG. 2.

FIG. 3 depicts signal processing and analysis process that may be performed by the apparatus of FIG. 2. In this process, compressive sensing measurements 20 are taken and used for signal processing 21, such as the interference removal procedure described below, and signal analysis 22. The signal analysis 22 provides information on a SOI 23, which is used to obtain further compressive sensing measurements 20 on the residual signal $x_R(t)$.

Figure 4:
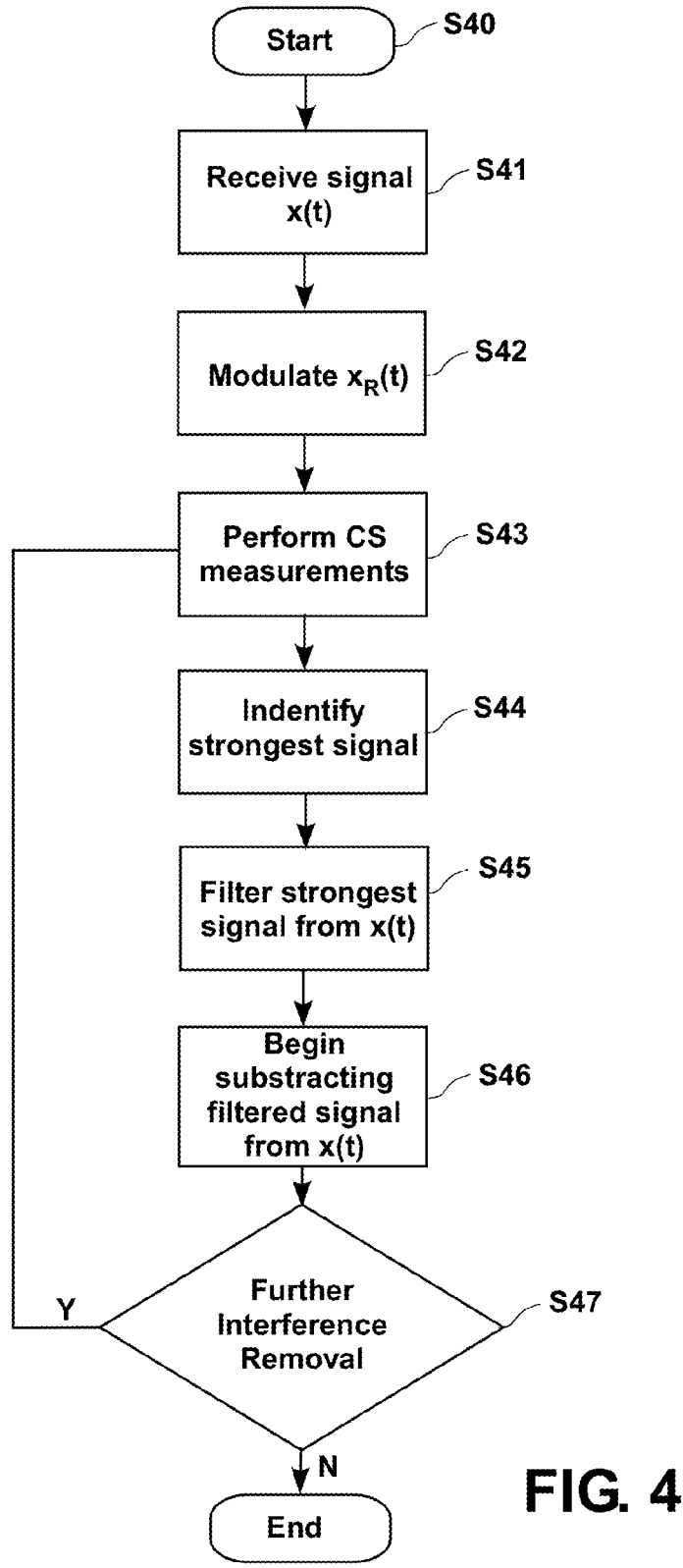
FIG. 4 is a flowchart of an example procedure for initializing an interference removal process using the apparatus of FIG. 2.

A procedure for initializing an interference removal process performed by the apparatus 11 will now be described with reference to FIGS. 1, 2 and 4.

Starting at step S40, the power divider 13 receives the signal x(t) received by the antenna array 2 (step S41). The bandwidth W covered by the system 1 is divided into N frequency bands. It is assumed that the received signal x(t) includes multiple narrowband signals $s_0$-$s_{N-1}$ within the N frequency bands, where multiple signals in the same frequency band are treated as one signal. If, at most, M of the N frequency bands (M<N) are occupied simultaneously at any given moment, the received signal x(t) may be approximated as:

$$x(t) = \sum_{k=-\frac{N}{2}}^{\frac{N}{2}-1} s_k e^{-i\pi t(2k+1)W/N}, \quad \text{(Equation 1)}$$

The interference removal stage 12 of FIG. 2 uses an iterative process, utilizing feedback from the signal detector to produce the residual signal $x_R(t)$ by subtracting interference from the signal x(t). However, at the start of the interference removal process, such feedback is not yet available and so the residual signal $x_R(t)$ initially corresponds to the received signal x(t).

The modulator 17 modulates the residual signal $x_R(t)$ with a pseudo-random signal p(t) 3 (step S42) by the sampler 18. In this particular example, the pseudo-random signal p(t) has the following format:

$$p(t) = p_n, t \in \left[\frac{n}{w}, \frac{n+1}{w}\right), n = 1, 2, \ldots, N \quad \text{(Equation 2)}$$

where $p_n$ is a sequence of numbers that take a value of +1 or −1 randomly and N is the number of frequency bands used to approximate the input signal x(t), as described above.

The sampler 18 performs compressive sensing measurements 4 (step S43) and generates samples y[N] of the modulated residual signal $x_R(t)$ 5, which can be expressed in matrix format as:

$$y = HDFs \quad \text{(Equation 3)}$$

where H, D and F are matrices:

$$H = \begin{bmatrix} 1 1 \ldots 1 & & & \\ & 1 1 \ldots 1 & & \\ & & \ldots & \\ & & & 1 1 \ldots 1 \end{bmatrix}, \quad \text{(Equation 4)}$$

$$D = \text{diag}(p_n) \quad \text{(Equation 5)},$$

and $$F = [e^{-j\pi n(2k+1)/N}]_{n,k}, \quad \text{(Equation 6)}$$

and $$y = \begin{bmatrix} y_1 \\ y_2 \\ \vdots \\ y_N \end{bmatrix} \text{ and } s = \begin{bmatrix} s_1 \\ s_2 \\ \vdots \\ s_N \end{bmatrix} \text{ are vectors, for } n = 0, \ldots, N-1 \text{ and}$$

$$k = -N/2, -N/2+1, \ldots, N/2-1.$$

The signal detector 19 then identifies the strongest of the N narrowband signals as indicated by the samples of the modulated residual signal $x_R(t)$ (step S44). The strongest narrowband signal is determined by first multiplying y with the conjugate transpose of HDF: s=F*D*H*y. The signal detector 19 then locates a center frequency of the frequency band that includes the strongest narrowband signal $s_1(t)$, corresponding to the largest energy: $\text{argmin}_j |s_j|$.

The result of this determination is sent to the narrowband receiver 14. From this point on, the narrowband receiver filters the strongest signal $s_1(t)$ from the received signal x(t) (step S45) and the mixer 15 subtracts that strongest signal $s_1(t)$, and any other previously identified strongest signals, from received signal x(t) (step S46), to produce the residual signal $x_R(t)$ (step S47).

If further interference removal is required (step S48), then steps S43 to S48 are repeated to make compressive sensing measurements of the modulated residual signal $x_R(t)$ (steps S43, S44), identify the next strongest signal (step S45), and filter the next strongest signal $x_2(t)$ from x(t) (step S46). The next strongest narrowband signal $s_2(t)$ is then combined with the previously identified strongest narrowband signal $s_1(t)$ or signals using the multiplexer 16 and subtracted from the received signal x(t) by the mixer 15 (step S47) until M narrowband signals $s_1(t)$ to $s_M(t)$ have been detected and are being subtracted from x(t) (steps S48, S49).

Compressive sensing measurements 20 of the modulated residual signal $x_R(t)$ 4, 5 taken by the sampler 18 may be used in reconstruction of the signal x(t) 6 by the signal detector 19. The samples y[N] of detected narrowband signals are used to reconstruct and refine the measurements of the received signal x(t) using a foveated compressed sensing (FCS) technique, informing both the processing 21 and analysis 22 of the received signal x(t), as shown in FIG. 3.

Compressed sensing theory is based on an assumption that signals are sparse in a discrete transform domain. However, real-world analog signals are, typically, not supported on a discretized grid, but are sparse in a continuous transform domain. The reconstruction technique described in the following is based on non-uniform sampling of the signal of interest, to allow for such characteristics of real-world signals. FCS techniques were developed for use in imaging, utilizing a small number of measurements to detect a region of interest (ROI) in an image d for reconstruction. In the present embodiment, a FCS technique is used for spatiotemporal monitoring of non-visual data, to detect an unknown signal in a wideband or ultra-wideband RF spectrum. An assumption is made that the unknown signal is sparse in that spectrum.

The reconstruction technique is based on an assumption that the signal of interest, y, is a linear combination of k tones, as follows:

$$y(t) = \sum_{l=1}^{k} a_l e^{-i2\pi f_l t}, \quad \text{(Equation 7)},$$

where:

$$f_l \in [0, N], a_l \in \mathbb{R}, \text{ for } t \in \mathbb{R} \quad \text{(Equation 8)}.$$

The reconstruction scheme includes an iterative process in which the signal detector 19 estimates the largest signal in the spectrum using a convex L1 minimization, such as:

$$\vec{x}^* = \text{argmin}_{\vec{x}} \ \|\vec{y} - DF\vec{x}\|_2^2 + \lambda \|\vec{x}\|_1, \quad \text{(Equation 9)},$$

where D is a diagonal matrix associated with the non-uniform time samples, F is the inverse Fourier matrix and λ is a tuning parameter with a value that is greater than 0.

The estimated frequencies $f_l$ from Equation (8) are used as initial values for solving the following minimization problem in the continuous domain by Newton's method:

$$\min_{f_1, f_2, \ldots, f_k \in [0,N]} \sum_{j=1}^{M} \|y_j - \sum_{l=1}^{k'} a_l e^{i2\pi f_l t_j}\|_2^2 \quad \text{(Equation 10)}.$$

Once the frequencies $f_l$ of components of the signal are obtained, their respective amplitudes $a_l$ can be determined, for example, by a least squares method.

These minimization steps, based on Equations (9) and (10), are repeated for further narrowband signals as they are detected by the signal detector 19.

While the above example is described with reference to Fourier transforms, the signal reconstruction technique is more general and can be used with other types of transformations.

The compressive sensing process will now be described in more detail, with reference to FIGS. 5 and 6.

Figure 5:
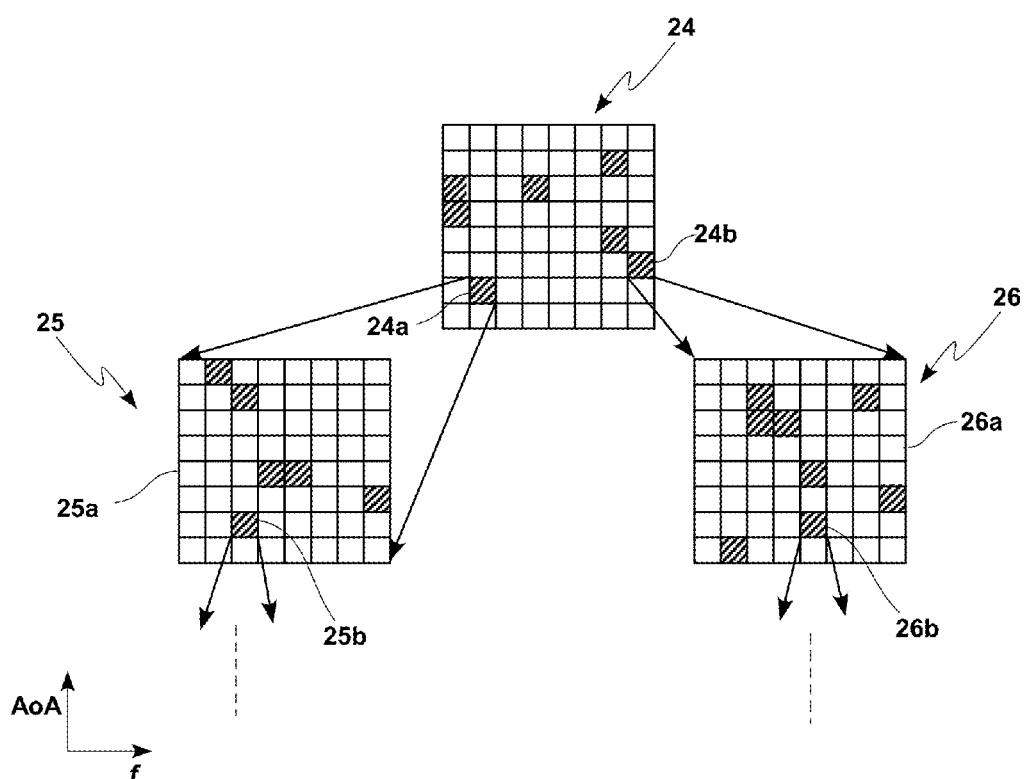
FIG. 5 depicts a hierarchical foveated measurements scheme for signal analysis and processing in an example embodiment.
Figure 6:
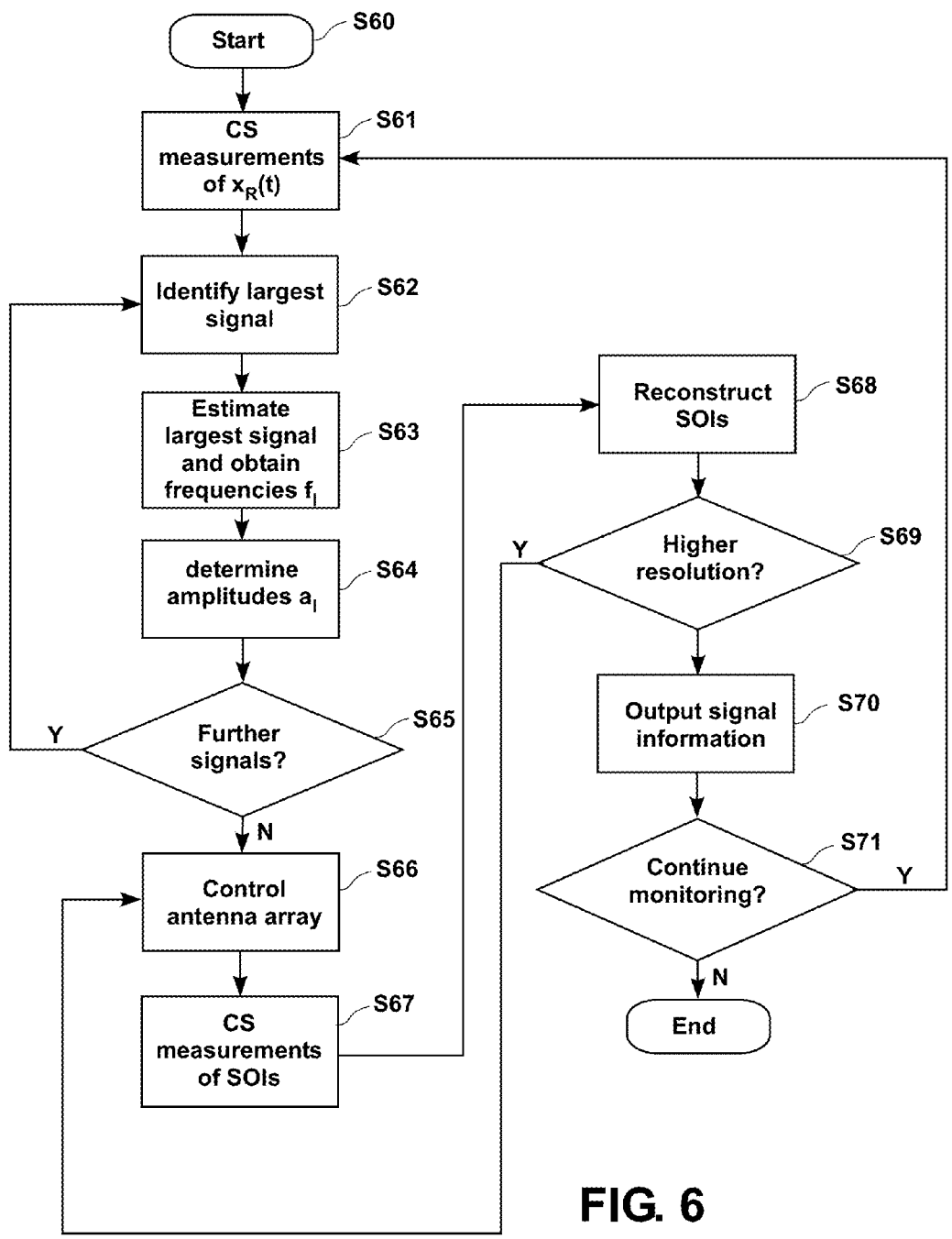
FIG. 6 is a flowchart of an example signal analysis process using the apparatus of FIG. 2 and the scheme of FIG. 5.

In FIG. 5, a hierarchy of two dimensional images 24, 25, 26 is used to represent the narrowband signals in a monitored wideband RF spectrum. In each of these example images, frequency f of the narrowband signals is indicated by the x-axis and the angle-of-arrival AoA is indicated by the y-axis. The first image 24 represents the modulated residual signal $x_R(t)$, across the monitored wideband RF spectrum and a first, widest, range of angles-of-arrival AoA. The shaded regions represent SOIs 24a, 24b, etc. within the modulated residual signal $x_R(t)$. Subsequent images 25, 26 represent the SOIs 24a, 24b at a higher resolution than that provided by the first image 24.

Starting at step S60, compressed measurements of the modulated residual signal $x_R(t)$ are taken at a sub-Nyquist rate 5 by the sampler 18 (step S61). The samples y[N] are then analyzed by the signal detector 19 to identify the strongest of the narrowband signals of $x_R(t)$ as a SOI 24a (step S62). In this particular example, the strongest signal is identified using the technique described above in relation to step S44 in FIG. 4.

The strongest signal is then estimated and the frequencies $f_l$ used to reconstruct the SOI 24a are obtained (step S63), for example, by using an iterative process based on Equations (9) and (10) as described above.

Once the frequencies $f_l$ have been obtained, the amplitudes $a_l$ for use in reconstructing the SOI 24a are then determined (step S64), for example, by using a least-squares method.

If further narrowband signals are to be analyzed (step S65), then the next strongest narrowband signal of $x_R(t)$ is identified as a SOI 24b (step S62) and estimated, and the frequencies $f_l$ and amplitudes $a_l$ for reconstructing that SOI 24b are determined (steps S63, S64), until each SOI 24a, 24b has been analyzed (step S65).

Information 23 such as the frequency f and angle of arrival AoA of the identified SOIs 24a, 24b etc., is then used to control the antenna array 2 to monitor signals in the frequency bands f and having the angles-of-arrival AoA corresponding to those of one or more of the SOIs 24a, 24b etc. (step S66). Compressed sensing measurements y of the SOIs 24a, 24b are then made by the sampler 18 (step S67), where:

$$y = \Psi M d \quad \text{(Equation 11)}$$

where d is the two-dimensional image 24, $\Psi$ is a compressed sensing matrix, e.g. $\Psi = HD$ and M is a mask defining at least one SOI 24a, 24b.

If the image d has a sparse representation in a dictionary $\Phi$, e.g. $\Phi = F$, that is, where $d = \Phi x$ and x is sparse, the SOIs 24a, 24b can be reconstructed accurately (step S68), for example, by using the following minimization:

$$\min_x \|\Psi M \Phi x - y\|_2 + \lambda \|x\|_1 \quad \text{(Equation 12)}$$

If higher resolution frequency and/or angle-of-arrival information is required (step S69), then further SOIs 25a, 26a can be identified within the SOIs 24a, 24b. Information regarding the newly identified SOIs 25a, 25b, 26a, 26b is then used to control the antenna array 2 to make further measurements of the SOIs 25a, 25b, 26a, 26b (step S66). Foveated compressed measurements y of the SOIs 25a, 26a are made (step S67) and analyzed, and further SOIs are identified (step S68). In this manner, measurements of the modulated residual signal $x_R(t)$ and SOIs are made at different resolutions according to their level in the hierarchy of images 24, 25, 26.

The process of identifying and processing further SOIs (steps S66 to S69) may be repeated until a required frequency resolution and, in this example, angle-of-arrival resolution, is reached (step S69). If required, frequency and angle-of-arrival information for one or more of the SOIs identified in the process is output 7, 23 (step S70).

The system may continue monitoring the wideband RF spectrum (step S71) for other signals or to track signals based on frequency f and angle-of-arrival AoA information of one or more of the identified SOIs 24a, 24b etc. For example, if an identified SOI 24a corresponds to a frequency hopping signal, that signal may be tracked by continuing to monitor at least part of the wideband RF spectrum.

The process ends at step S72.

In the present technique, the processing of the received signal d is adapted to prioritize analysis of SOIs 24a, 24b, 25a, 25b, 26a, 26b by directing the processing resources of the system to those parts of the received signal x(t). A hierarchy of images d, corresponding to signals having a frequency f and angle-of-arrival AoA within selected ranges are analyzed at various resolutions, based on whether a SOI is present. Through prioritizing analysis of such SOIs, the technique may be used to provide fast, wideband, continuous RF spectrum sensing and, optionally, high-resolution AoA estimation, even where the SOI is a frequency hopping signal. The inclusion of AoA estimation in the signal detection process can provide the capability of handling correlated signals, allowing the technique to be used to detect and track multipath signals.

The reduced processing requirements of the present technique may allow a faster detection speed to be achieved, when compared with earlier systems using spectrum sweeping to cover a wide bandwidth, thereby improving signal tracking ability. Also, the use of a FCS technique can improve signal-to-noise ratio by reducing gridding error because measurements are allocated toward detected narrowband signals and allows the use of processing resources to be adapted according to requirements of the task at hand.

Use of compressive sensing (CS) can reduce, or even avoid, the need for channelizers to cover wide bandwidth. Also, since high-level signal analysis is used to identify and prioritize a SOI, the present embodiment can avoid unnecessary data collection and processing for parts of a monitored spectrum that do not include a SOI. This can decrease the amount of processing required to detect and analyze a signal and, therefore, reduced cost when compared with systems utilizing channelizers. Also, with the exception of the assumption that the signal d is sparse, the present embodiment avoids assuming characteristics of the signal and so is not limited to a specific class of signals.

Some embodiments may be extended to include parameter estimation without requiring additional measurements. For example, in the above embodiment, AoA is estimated and simultaneous reconstruction where there are multiple unknown variables—e.g. temporal hopping frequency and angle of arrival, may be performed in an efficient way. Alternatively, or additionally, higher dimensional reconstructions can be made using such a technique.

Figure 7:
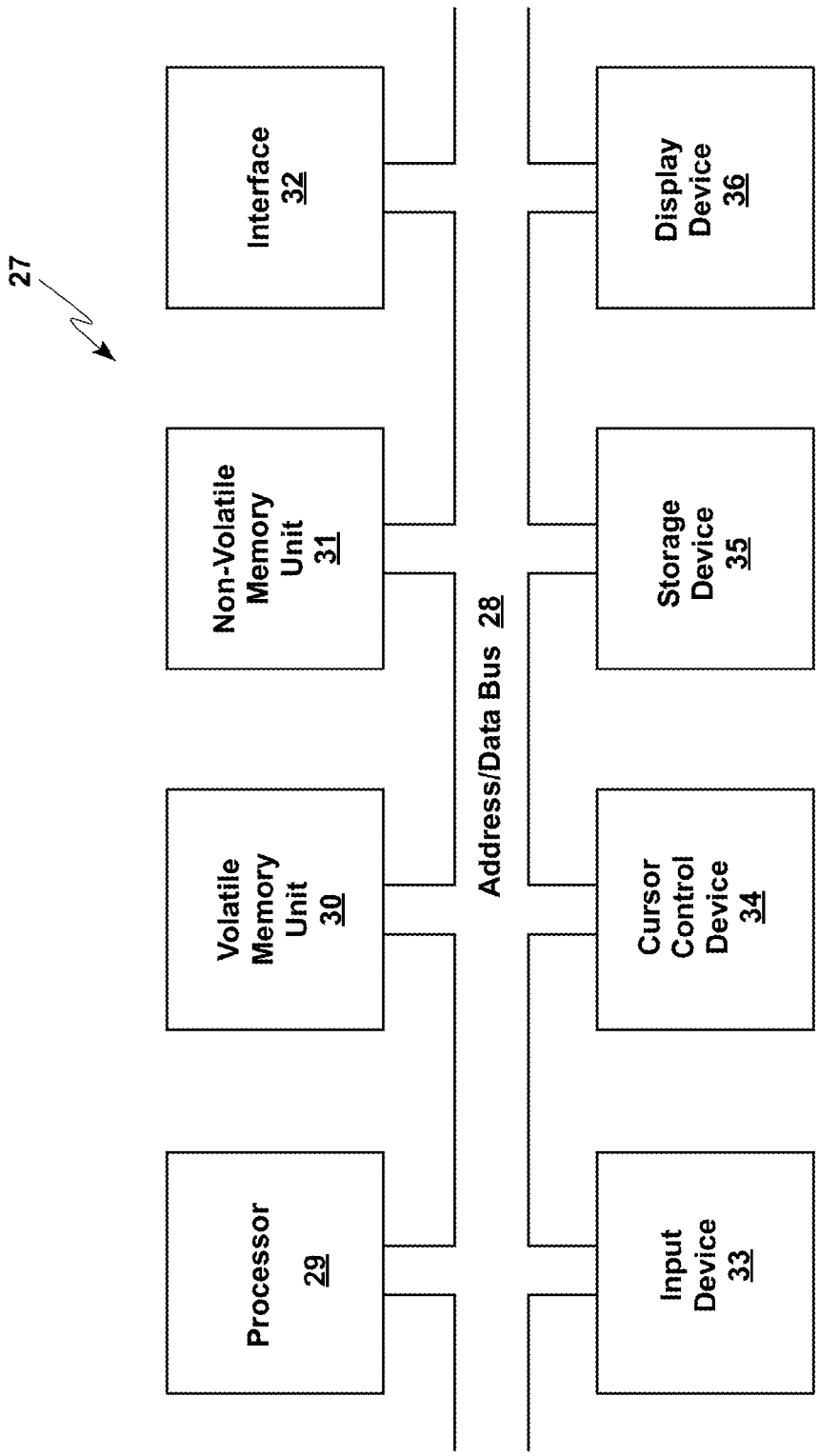
FIG. 7 depicts a computer system that can be used to implement at least part of the apparatus of FIG. 2.

As noted above, at least some parts of the apparatus 11 shown in FIG. 2 may be implemented by a computer system. For example, one or more of the compressive sensing measurements made by the sampler 18, the analysis of the samples y[N] to identify the strongest narrowband signals and signal reconstruction by the signal detector 19 and the control of the antenna array 2 may be performed using a computer system. An exemplary computer system 27 in accordance with an embodiment is shown in FIG. 7.

Exemplary computer system 27 is configured to perform calculations, processes, operations, and/or functions associated with a program or algorithm. In one embodiment, certain processes and steps discussed herein are realized as a series of instructions, e.g. software program, that reside within computer readable memory units and are executed by one or more processors of exemplary computer system 27. When executed, the instructions cause exemplary computer system 27 to perform specific actions and exhibit specific behavior, such as described herein.

Exemplary computer system 27 may include an address/data bus 28 that is configured to communicate information. Additionally, one or more data processing units, such as processor 29, are coupled with address/data bus 28. Processor 29 is configured to process information and instructions. In an example embodiment, processor 29 is a microprocessor. Alternatively, processor 29 may be a different type of processor such as a parallel processor, or a field programmable gate array.

Exemplary computer system 27 is configured to utilize one or more data storage units 30, 31. Exemplary computer system 27 may include a volatile memory unit 30, e.g., random access memory ("RAM"), static RAM, dynamic RAM, etc., coupled with address/data bus 28, wherein volatile memory unit 30 is configured to store information and instructions for processor 29. Exemplary computer system 27 further may include a non-volatile memory unit 31, such as read-only memory ("ROM"), programmable ROM ("PROM"), erasable programmable ROM ("EPROM"), electrically erasable programmable ROM "EEPROM"), flash memory, etc., coupled with address/data bus 28, wherein non-volatile memory unit 31 is configured to store static information and instructions for processor 29.

Alternatively, or additionally, exemplary computer system 27 may execute instructions retrieved from an online data storage unit such as in "Cloud" computing. In an embodiment, exemplary computer system 27 also may include one or more interfaces, such as interface 32, coupled with address/data bus 28. The one or more interfaces are configured to enable exemplary computer system 27 to interface with other electronic devices and computer systems. The communication interfaces implemented by the one or more interfaces 32 may include wireline communication technology, such as serial cables, modems, network adaptors, etc., and/or wireless communication technology, such as wireless modems, wireless network adaptors, etc.

In one embodiment, exemplar computer system 27 may include an input device 33 coupled with address/data bus 28, wherein input device 33 is configured to communicate information and command selections to processor 29. In accordance with one embodiment, input device 33 is an alphanumeric input device, such as a keyboard, that may include alphanumeric and/or function keys. Alternatively, input device 33 may be an input device other than an alphanumeric input device.

Alternatively, or additionally, exemplar computer system 27 may include a cursor control device 34 coupled with address/data bus 28, wherein cursor control device 34 is configured to communicate user input information and/or command selections to processor 28. In an embodiment, cursor control device 1270 is implemented using a device such as a mouse, a track-ball, a track-pad, an optical tracking device, or a touch screen. The foregoing notwithstanding, in an embodiment, cursor control device 34 is directed and/or activated via input from input device 33, such as in response to the use of special keys and key sequence commands associated with input device 33. In an alternative embodiment, cursor control device 34 is configured to be directed or guided by voice commands.

Figure 8:
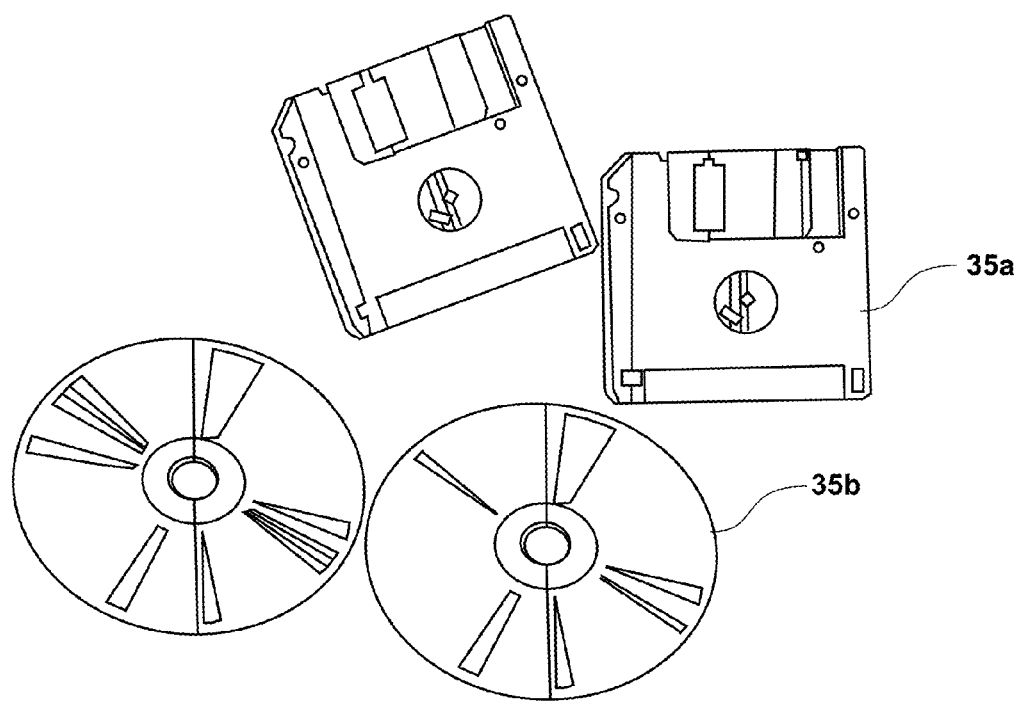
FIG. 8 depicts examples of data storage devices that may be used with the computer system of FIG. 7.

In an embodiment, exemplary computer system 27 further may include one or more optional computer usable data storage devices, such as storage device 35, coupled with address/data bus 28. Storage device 35 is configured to store information and/or computer executable instructions. In one embodiment, storage device 35 is a storage device such as a magnetic or optical disk drive, such as a hard disk drive ("HDD"), floppy diskette, compact disk read only memory ("CD-ROM"), or digital versatile disk ("DVD"). Example storage devices 35, in the form of floppy diskettes 35a and CD-ROMs 35b, are shown in FIG. 8.

Pursuant to one embodiment, a display device 36 is coupled with address/data bus 28, wherein display device 36 is configured to display video and/or graphics. In an embodiment, display device 36 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 27 is presented herein as an exemplary computing environment in accordance with an embodiment. However, exemplary computer systems that can be used to implement the techniques discussed above are not strictly limited to computer systems per se. For example, an embodiment provides that exemplary computer system 27 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology may be controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Other modifications and variations to the above embodiment will be apparent to persons skilled in the art, and the method steps described above might be interchangeable with other steps to achieve the same result. It is intended that the scope of the disclosure be interpreted with reference to the claims appended hereto and their equivalents.

Reference to an element in the singular hereinabove is not intended to mean "one and only one" unless explicitly so stated, but rather "one or more". Moreover, no element, component or method step in the present disclosure is intended to be dedicated to the public, regardless of whether the element, component or method step is explicitly recited in the accompanying claims. No claim element herein is to be construed under the provisions of 35 U.S.C. §112, sixth paragraph, unless the element is expressly recited using the phrase "means for . . . ".

The invention claimed is:
1. A spatio-temporal signal monitoring system comprising:
 a sampler configured to:
 receive a radio frequency signal in a first frequency band, said radio frequency signal covering a first range of at least one other parameter of the radio frequency signal; and obtain first compressive sensing measurements of said received signal at a first resolution level, wherein the received signal has an angle of arrival at a third resolution; and a signal detector configured to:

identify a first signal of interest based on said first compressive sensing measurements;

determine a second frequency band corresponding to a said first signal of interest within the received radio signal, the second frequency band being narrower than the first frequency band, and a second range of the at least one other parameter corresponding to the said first signal of interest, said second range being narrower than said first range;

the sampler being further configured to obtain second compressive sensing measurements of said received signal at a second resolution level, said second compressive sensing measurements corresponding to solely said second frequency band and said second range of said at least one other parameter, and said second resolution level being higher than said first resolution level; and determine an angle of arrival of said received signal at a fourth resolution, wherein the fourth resolution is more accurate than the third resolution.

2. The system of claim 1, wherein said signal detector is further configured to:

identify a second signal of interest based on said second compressive sensing measurements;

determine a third frequency band corresponding to the second signal of interest and a third range of said at least one other parameter corresponding to said second signal of interest, said third frequency band being narrower than said second frequency band and said third range being narrower than said second range; and obtain third compressive sensing measurements of said received signal at a third resolution level, said third compressive sensing measurements corresponding to said third frequency range and said third range, and said third level of resolution being higher than said second level of resolution.

3. The system of claim 1, wherein the signal detector is configured to output an estimate of said at least one other parameter of the second signal of interest, based on said second range.

4. The system of claim 1, wherein the signal detector is configured to output an estimate of the at least one other parameter of the first signal of interest.

5. The system of claim 1, configured to continue obtaining first compressive sensing measurements of the radio frequency signal in the first frequency band to track the said first signal of interest, where said first signal of interest is a frequency-hopping signal.

6. The system of claim 2, wherein the signal detector is configured to output an estimate of said at least one other parameter of a subsequently identified signal of interest within said second signal of interest, based on a subsequently determined range of said at least one other parameter, said subsequently determined range being narrower than said second range.

7. The system of claim 3, wherein said at least one other parameter comprises an angle-of-arrival.

8. A spatio-temporal signal monitoring method comprising:

receiving a radio frequency signal, said received radio frequency signal covering a first frequency band;

obtaining first compressive sensing measurements of said received radio frequency signal at a first resolution level, wherein the received signal has an angle of arrival at a third resolution;

identifying at least one signal of interest based on said first compressive sensing measurements, wherein said identifying at least one signal of interest comprises determining a second frequency band corresponding to the at least one signal of interest, the second frequency band being narrower than the first frequency band; and performing second compressive sensing measurements solely on said at least one signal of interest on said second frequency band at a second resolution level, said second resolution level being higher than said first resolution level; and determining an angle of arrival of said at least one signal of interest at a fourth resolution, wherein the fourth resolution is more accurate than the third resolution.

9. The method of claim 8, wherein:

said received radio frequency signal covers a first range of at least one other parameter of the radio frequency signal than the frequency band;

said identifying at least one signal of interest comprises determining a second range of the at least one other parameter corresponding to the at least one signal of interest, said second range being narrower than said first range; and said second compressive sensing measurements correspond to said second range of said other parameter.

10. The method of claim 8, comprising:

continuing to obtain first compressive sensing measurements of the radio frequency signal in the first frequency band to track the signal of interest, where said signal of interest is a frequency-hopping signal.

11. The method of claim 9, wherein the signal detector is configured to output an estimate of said at least one other parameter of the second signal of interest, based on said second range.

12. The method of claim 9, further comprising:

identifying a second signal of interest based on said second compressive sensing measurements;

determining a third frequency band corresponding to the second signal of interest and a third range of said at least one other parameter corresponding to said second signal of interest, said third frequency band being narrower than said second frequency band and said third range being narrower than said second range; and obtaining third compressive sensing measurements of said received signal at a third resolution level, said third compressive sensing measurements corresponding to said third frequency range band and said third range, and said third level of resolution being higher than said second level of resolution.

13. The method of claim 9, wherein said at least one other parameter comprises an angle-of-arrival.

14. The method of claim 12, further comprising:

outputting an estimate of said at least one parameter of a subsequently identified signal of interest within said second signal of interest, based on a subsequently determined range of said at least one other parameter, said subsequently determined range being narrower than said second range.

* * * * *